United States Patent [19]
Weaver, Jr. et al.

[11] Patent Number: 4,905,177
[45] Date of Patent: Feb. 27, 1990

[54] HIGH RESOLUTION PHASE TO SINE AMPLITUDE CONVERSION

[75] Inventors: Lindsay A. Weaver, Jr.; Richard J. Kerr, both of San Diego, Calif.

[73] Assignee: Qualcomm, Inc., San Diego, Calif.

[21] Appl. No.: 145,789

[22] Filed: Jan. 19, 1988

[51] Int. Cl.$^4$ .............................................. G06F 1/00
[52] U.S. Cl. ................................................. 364/721
[58] Field of Search .................. 364/721, 724.01, 718, 364/724.06, 724.08; 332/1, 18

[56] References Cited

U.S. PATENT DOCUMENTS

| 3,633,017 | 1/1970 | Crooke | 235/156 |
|---|---|---|---|
| 3,654,450 | 4/1972 | Webb | 235/197 |
| 3,877,022 | 4/1975 | Lehman et al. | 340/347 |
| 3,882,403 | 5/1975 | Gerken | 328/14 |
| 3,999,129 | 12/1976 | Kasson | 325/42 |
| 4,011,438 | 3/1977 | Aufderheide et al. | 235/152 |
| 4,039,951 | 8/1977 | Bruce et al. | 325/38 R |
| 4,105,949 | 8/1978 | Hardin | 331/37 |
| 4,134,072 | 1/1979 | Bolger | 328/14 |
| 4,185,247 | 1/1980 | Harrison, Jr. | 328/165 |
| 4,304,965 | 12/1981 | Blanton et al. | 364/724 |
| 4,315,219 | 2/1982 | Rocheleau et al. | 328/14 |
| 4,328,554 | 5/1982 | Mantione | 364/721 |
| 4,331,941 | 5/1982 | Kovalick et al. | 332/31 R |
| 4,345,500 | 8/1982 | Alonso et al. | 84/1.01 |
| 4,346,477 | 8/1982 | Gordy | 455/257 |
| 4,410,954 | 10/1983 | Wheatley | 364/701 |
| 4,449,117 | 5/1984 | Fortescue | 340/347 SY |
| 4,454,486 | 6/1984 | Hassun et al. | 332/16 R |
| 4,475,220 | 10/1984 | Mattei et al. | 375/86 |
| 4,482,974 | 11/1984 | Kovalick | 364/607 |
| 4,484,296 | 11/1984 | Treise et al. | 364/607 |
| 4,486,846 | 12/1984 | McCallister et al. | 364/607 |
| 4,494,073 | 1/1985 | Sorgi | 328/14 |
| 4,506,228 | 3/1985 | Kammeyer | 329/107 |
| 4,512,035 | 4/1985 | Victor et al. | 455/165 |
| 4,603,304 | 7/1986 | Burns et al. | 331/2 |
| 4,646,032 | 2/1987 | Wheatley et al. | 331/78 |
| 4,652,832 | 3/1987 | Jasper | 328/14 |
| 4,659,999 | 4/1987 | Motoyama et al. | 331/2 |
| 4,682,122 | 7/1987 | Remy et al. | 331/2 |
| 4,682,123 | 7/1987 | Loper et al. | 332/16 R |
| 4,700,390 | 10/1987 | Machida | 381/29 |
| 4,701,934 | 10/1987 | Jasper | 375/1 |
| 4,707,665 | 11/1987 | Nugent et al. | 328/14 |
| 4,727,506 | 2/1988 | Fling | 364/745 |
| 4,750,214 | 6/1988 | Hart et al. | 455/214 |

FOREIGN PATENT DOCUMENTS 82110621 4/1982 European Pat. Off. .
53-153395 6/1978 Japan .

OTHER PUBLICATIONS

"Dither Signals and Their Effect on Quantization Noise," Leonard Schuchman, *IEEE Transactions on Communication Technology*, Dec. 1964, pp. 162–165.

"Understanding Microwave Frequency Synthesizers," C. E. Barlow, IEEE *Transactions on Communication Technology, the Electronic Engineer*, Nov. 1987, pp. 36–38.

*Primary Examiner*—Gary V. Harkcom
*Assistant Examiner*—Long T. Nguyen
*Attorney, Agent, or Firm*—Brown, Martin, Haller & McClain

[57] ABSTRACT

A method and apparatus for converting phase data into amplitude data. Input phase data is divided into upper and lower phase increments using an input splitter which can also fold in quadrant data. One or more storage elements, such as sine and cosine ROMs, are connected to the input splitter and generate an amplitude, which forms one of a plurality of series terms, and first and second derivatives of the amplitude in response to the upper phase increment. The first derivative and lower phase increment are multiplied together in a digital multiplier to produce a second series term. A third series term comprising a product of the amplitude and lower phase increment squared, is generated by a term generator connected to the splitter and to the storage element. The term generator can comprise elements such as a ROM addressable by the lower phase increment and the amplitude. The first, second and third series terms are subsequently added together by one or more digital adders connected to the multiplier, term generator, storage element and in series with each other to form an output amplitude. An output controller is used for transferring the output amplitude to other apparatus and for incorporating quadrant unfolding elements.

20 Claims, 3 Drawing Sheets

HIGH RESOLUTION PHASE TO SINE AMPLITUDE CONVERSION

BACKGROUND OF THE INVENTION

1. Field of the Invention

The present invention relates to frequency synthesis and more particularly to direct digital synthesizers employing look-up tables for converting phase data into an amplitude of a periodic function. The invention further relates to a method and apparatus for converting incremental phase values into sine amplitude numbers employing a series expansion technique for increasing output accuracy per unit memory size.

2. Background of the Art

The commercial viability of advanced digital communication systems involving remote or mobile users and relay systems depends on several key design factors and user requirements. Circuit elements must provide high speed data transfer with high frequency accuracy or resolution to accommodate a large number of users. The circuitry needs to be relatively inexpensive to manufacture while being highly reliable and consume a minimum amount of power to present a low drain on mobile users.

Direct Digital Synthesizer (DDS) circuits are very useful as reference or carrier wave frequency sources for advanced digital communication applications. DDS circuits can be built as large scale integrated circuits to reduce power consumption while using a relatively low number of discrete components or internal parts to increase reliability, reduce production costs, and maintain high speed and high resolution operation.

Direct Digital Synthesizers generally accumulate phase data in the form of discrete increments of phase in an accumulator from which they are transferred on a periodic basis to a phase to amplitude converter. The phase data is then correlated with an amplitude which corresponds to the amplitude of a desired periodic function at that phase. That is, a chosen periodic function, typically a sine wave, has a given amplitude at a given phase and amplitude values are selected for each input phase value accordingly. The selection or conversion process generally utilizes a sine look-up table stored in a Read Only Memory (ROM) circuit which contains preselected amplitudes corresponding to given phase positions of the periodic function.

The spectral purity of the DDS output is determined by the accuracy or resolution of amplitude values stored in ROM and quantization errors in the phase to amplitude conversion and digital-to-analog conversion steps. The resolution of the digital to analog conversion as well as the generation of spurious noise is also dependent upon the resolution of the input data to the DAC. That is, for n-bit wide digital amplitude input data the output noise level decreases a related amount per bit width, typically on the order of 6 dB per DAC input bit. A 12 bit DAC input, or amplitude output, would provide about a 72 dB drop in the power level of noise spurs. Therefore, it is desirable to increase the resolution of the ROM output to decrease quantization errors in the DAC stage and decrease spurious noise. This means the amplitude values need to be defined or stored in the ROM in as high a resolution or bit width as possible to decrease noise.

However, the higher the resolution of the amplitude values or larger bit size, the larger the ROM. Unfortunately, larger ROM storage means higher power consumption, larger parts count in the ROM structure, lower reliability, lower speed, and greatly increased costs. Increasing ROM size to achieve improved resolution provides a diminishing return in terms of related operating parameters for the DDS. Therefore, the DDS is constructed with a more limited resolution to optimize other factors such as cost.

A few techniques have been developed in an attempt to decrease quantization errors during sine conversion and increase the effective resolution. One such technique is shown in "A Digital Frequency Synthesizer", J. Tierney, IEEE Trans. Audio. Electroacoust., Vol AU-19, p 48, March 1971, in which the input phase data is divided into two phase angles whose amplitudes are computed and summed together to provide the final output. Another technique is disclosed in "CMOS/SOS Frequency Synthesizer LSI Circuit for Spread Spectrum Communications", D. A. Sunderland, et. al, IEEE Journal of Solid-State Circuits, Vol SC-19, No. 4, pp. 497–505, August 1984, where three phase angles are converted to small amplitude increments which are summed together. While these approaches have helped with quantization errors arising from the ROM conversion process, they have not greatly increased the accuracy of the output of the amplitude conversion process.

High accuracy is needed in addition to high resolution in order to provide an advanced communications frequency source. That is, even with resolution high and spurious noise reduced to a minimum, the accuracy to which the frequency is known must also be high. High accuracy in is required to provide error free fine tuning for accurate and reproducible frequency selection in advanced communications.

Accuracy can also be increased by increasing the bit width of the data stored in ROM. However, as before, this degrades the overall performance of the conversion process and apparatus. An alternative is to provide circuitry for performing pure computation, without look-up tables, of the amplitude values directly from input phase values. This can be accomplished with very high degrees of accuracy. Computational processes, however, are much slower and decrease the speed of the sine conversion process. At the same time, purely computational circuits generally require additional area for the various internal components used.

What is needed is a method and apparatus for converting phase data to amplitude data with high accuracy and resolution output for a minimum of memory size. The method should perform the conversion at the high speeds associated with look-up tables but with increased accuracy associated with purely computational circuits. A conversion apparatus is needed to implement this method, which generates a high accuracy output at very high clock rates with a minimum of circuit area or components.

SUMMARY

With the above problems and drawbacks of the art in mind, it is one purpose of the present invention to convert phase increment data into amplitude data with increased accuracy for a minimum memory size.

An advantage of the present invention is that the size of memory required to store amplitude data and its derivatives is small for a given output accuracy.

Another purpose of the present invention is to provide an apparatus for converting digital phase data into digital amplitudes of a sine function with high accuracy.

Another advantage of the invention is that the conversion of phase data into sine amplitude data occurs at high clock rates.

A further purpose of the present invention is to apply a series expansion to the conversion of phase data to amplitude data which increases the accuracy of the output amplitude data.

Yet another advantage of the present invention is that the conversion of phase data into sine amplitude data incorporates quadrant mapping which reduces stored table sizes.

These and other purposes, objects, and advantages are found in a method for converting phase data into amplitude data of a preselected periodic function, comprising the steps of dividing phase data into upper and lower phase increments and performing a Taylor series expansion about the upper phase increment. The Taylor series expansion is performed by generating at least three terms and summing them together where each Nth term is formed by generating an N−1 order derivative of the periodic function; raising the lower phase increment to an N−1 power; forming an inverse of N−1 factorial; and multiplying the N−1 order derivative the N−1 power raised lower phase increment, and the inverse of N−1 factorial together. In the preferred embodiment an amplitude is generated in response to the upper phase increment as the Nth series term by applying the periodic function to said upper phase increment. The amplitude defines an Nth term of a plurality of successive series terms with N generally being equal to 1. A first and at least a second derivative of the amplitude are generated.

A product of the lower phase increment and a predetermined units conversion factor is formed and multiplied times the first derivative of the amplitude to form an N+1 series term. The lower phase increment, is squared and along with a units conversion factor multiplied by the second derivative with this quantity divided by an N+1 factorial to form an N+2 series expansion term. The N+1 and N+2 series terms are added together to form a first addend which is further added to the N series term to form the final output.

The method of the present invention can further comprise generating N+Y order derivatives of said amplitude in response to said upper phase increment, where Y is greater than 2. The product of the unit conversion factor, said lower phase increment raised to the N+Y power the N+Y order derivative, and the inverse of the N+Y factorial form an N+Y series factor which is added to the first addend.

Generally input phase data is provided by a phase accumulator in increments over a range between 0 and πc. To decrease the size of circuit required to handle this entire range, the input data is mapped into one of four quadrants and imaged into a single quadrant between 0 and π/2. The relative quadrant position of the input phase is used by a quadrant folder to adjust the sign of either the phase input or the amplitude output to reflect the appropriate quadrant for the input phase data at the output.

Amplitude and derivative values are generated by introducing the upper phase increment into sine and first derivative, cosine, ROMs respectively as data addresses. The third series term is generated by introducing the lower phase increment value into an expansion term ROM as a portion of a data address and introducing the amplitude into the term ROM as a remaining portion of the data address.

An apparatus for achieving the steps of the invention comprises an input means for dividing phase data into the respective upper and lower phase increments connected to a storage means for generating an amplitude and at least a first and a second derivative of the amplitude for the preselected function in response to the upper phase increment. A digital multiplication element connected to the storage means and the input means receives the first derivative and the lower phase increment and multiplies them together to produce a second series term. A third series term generator is also connected to the input means and to the storage means for receiving the second derivative and lower phase increment, squaring the phase increment and generating a term corresponding to the product of the second derivative and squared lower phase increment values. The first, second, and third series terms are added together by a digital summation element.

In further aspects of the invention, the summation element comprises a first digital adder connected to the multiplication element and term generator for summing the second and third series terms to form a first addend. A second digital adder is connected to the first for summing the first addend and the amplitude to form an output amplitude. An output means is connected to the second adder means for transferring the output amplitude to other apparatus.

The storage means comprises an amplitude storage means in the form of a sine ROM storing predetermined sine values, and a derivative storage means in the form of a cosine ROM storing predetermined cosine values, both providing their outputs in response to the upper phase increment. The term generator comprises an expansion term ROM which stores predetermined product values for the square of the lower incremental phase data times the sine data. The input further comprises a quadrant detector for determining which of four quadrants the phase data resides in and a quadrant adjustment means connected between the input and the output for altering the sign of the output amplitude to reflect the correct quadrant of origin for the phase data giving rise to the amplitude data.

BRIEF DESCRIPTION OF THE DRAWINGS

The novel features of the present invention may be better understood from the accompanying description when taken in conjunction with the accompanying drawings in which like characters refer to like parts and in which.

DETAILED DESCRIPTION OF A PREFERRED EMBODIMENT

The present invention produces high accuracy sine amplitude data in a Direct Digital Synthesizer (DDS) circuit for conversion to a high resolution analog waveform. The high accuracy is obtained by applying a series expansion to input phase data as part of a sine look-up process. The conversion apparatus is configured to separate input phase data into upper and lower phase increments or angular displacements which are used as a basis for computing terms of the series expansion. The phase values are processed at high speed in a minimum sized memory using a minimum of circuitry to provide a plurality of series terms for the expansion. Appropriate factors are multiplied times individual series terms and the products summed to produce the desired amplitude output.

Figure 1:
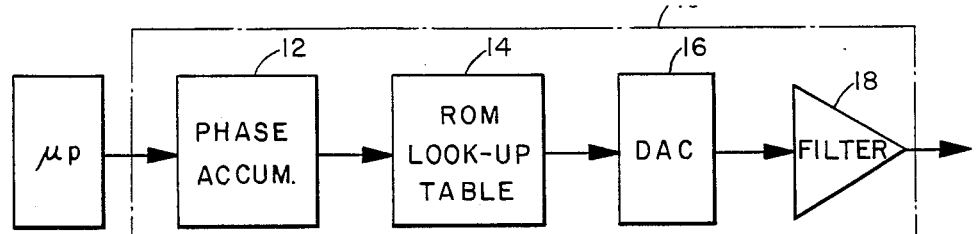
FIG. 1 illustrates a schematic of a basic DDS circuit.

The main components and operation of a typical DDS circuit are illustrated as a block diagram in FIG. 1. In FIG. 1, a Direct Digital Synthesizer 10 comprises a phase accumulator 12, a sine look-up ROM 14 and a Digital-to-Analog Converter (DAC) 16. A bandpass filter 18 may be employed where desired. The DDS 10 operates by accumulating incremental changes in phase at a constant clock rate, which determines the frequency of the output, converting the accumulated phase to amplitude data using a device such as a ROM look-up table 14, and converting the resulting digital amplitude to analog form using the DAC 16.

The phase increment data is generally provided by a microprocessor which computes desired phase values or, alternately, one or more memory devices which contain the desired phase data which is clocked to the accumulator 12 at a specified rate. The accumulator 12 collects the phase increments and outputs one accumulated phase value each preselected clock period.

The phase data is transferred to the sine ROM 14 which correlates the phase input with the amplitude of a preselected periodic function. The typical function is that of an idealized sine function, although other periodic functions cna be employed within the teachings of the present invention. As an example, some applications may require the use of triangle or sawtooth waves as opposed to sine waves. The ROM 14 table provides a quick and efficient means of converting phase to pre-assigned amplitude values within certain accuracy or resolution limitations.

The output of the sine ROM 14 is transferred to the DAC 16 where it is converted to an analog output signal at the desired frequency. However, even when quantization errors are minimized, the output accuracy and resolution of the DDS 10 is limited by the accuracy of the conversion process in the ROM 14. As discussed above, increasing the ROM accuracy has traditionally required storing more bits of information and increasing the memory size. But increased size means increased complexity, costs and power consumption with an associated decrease in reliability and speed.

In the present invention, the conversion process allows a higher accuracy in the output without increasing the complexity of the converter to such an extent that it decreases the speed and reliability of the DDS. This is accomplished by expanding the phase values about a point using a Taylor series expansion. The Taylor expansion series employed is expressed as the relationship:

$$f(x) = f(a) + (x - a)f'(a) + \frac{(x - a)^2 f''(a)}{2!} + \cdots ,$$

where f' and f'' are the first and second derivatives of f respectively. While additional derivative terms can be employed, their contribution to accuracy is very small and, therefore, of little weight in most current applications. That is, other inaccuracies present in the operation of current DDS designs override the finer accuracy provided by successive series terms. However, when the conversion circuits are capable of reliable, high speed computations using larger computational circuit elements, and the DDS is otherwise more accurate, additional terms in the series can be employed within the teachings of the present invention.

At the same time, the present invention is not limited to using only groups of successive series terms beginning with the first series term. That is, for some applications a number of successive terms beginning with the Nth term, where N is larger than 1, can be employed to compute a corresponding or desired amplitude value. In some applications, alternating terms such as odd or even terms only could be employed. For the sake of clarity and as a preferred embodiment, the remaining discussion describes the use of series terms beginning with the first possible term (N=1).

Figure 2:
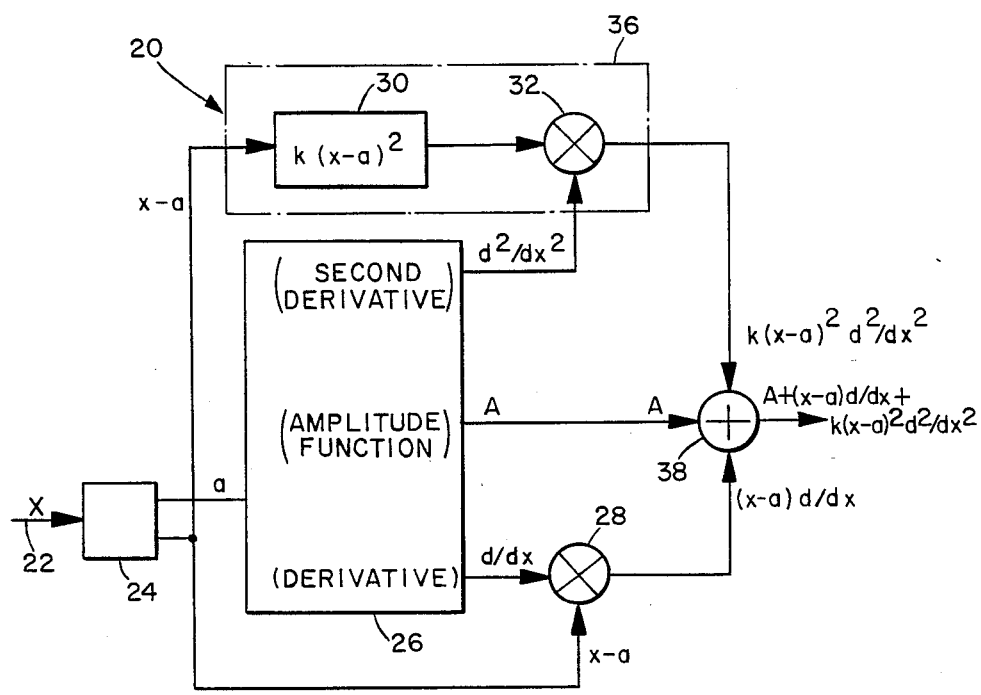
FIG. 2 illustrates a sine conversion circuit for use in DDS circuits, constructed and operating according to the principles of the present invention.

A sine conversion apparatus for implementing this series expansion for the input phase is illustrated in FIG. 2. In FIG. 2, a sine converter 20 receives input phase data 22 and splits it into two components, an upper phase increment and a lower phase increment. This splitting step is simplified when working with multi-bit digital data representation for the phase data.

Each input digital word represents a numerical value for phase between 0 and $2\pi$ which changes at a specified clock rate. The Most Significant Bits (MSBs) of the input phase data words represent a lower resolution or coarse part of the angular phase increment and the Least Significant Bits (LSBs) represent a higher resolution or fine part of the input phase angle. In the method and apparatus of the present invention the angles or angular displacements "a" and "x-a" are selected by dividing the total number of bits in the input phase numbers into two segments of MSB and LSB bits, each having predetermined bit widths. This is accomplished by a phase splitter 24 which separates and redirects the MSB and LSB segments.

The value for "a" is transferred to a storage element 26 such as a ROM containing an array of amplitude values which correspond to input phase values for "a". At the same time, each amplitude value for the chosen amplitude function has a first and second derivative associated with it which is also stored in the storage element 26. In the alternative, a series of separate storage elements or ROMs are used to implement the single storage element 26. Such ROMs can be constructed on a single large scale integrated circuit which allows use of new lower power consumption devices.

The input of the "a" value causes the storage element 26 to output the corresponding amplitude value A; the first derivative value d/dx, evaluated at "a"; and the second derivative value $d^2/dx^2$ also evaluated at "a", along the illustrated separate output lines. The amplitude value A, is the first term in the series expansion listed above but the second series term requires multiplying the lower phase increment "x-a", times the first derivative value d/dx. This multiplication process is accomplished by inputting these two values into a digital multiplier 28.

The third term in the expansion is formulated by first squaring the phase increment "x-a" and multiplying the squared phase increment $(x-a)^2$ by a constant k, where $k=\frac{1}{2}!$, using a multiplier 1 squaring element 30. The $k(x-a)^2$ and $d^2/dx^2$ values are then multiplied together in a digital multiplier 32 to formulate the third term in the series expansion. However, those skilled in the art will readily understand that the multiple of the second derivative and the product of k and the square of "x-a" can be prestored in a ROM so that a ROM can be used as a single element to replace those elements surrounded by the dashed line 36 of FIG. 2.

The amplitude value A output from storage element 26 along with the second series term, (x-a)d/dx from multiplier 28, and the third series term, k(x-a)²d²/dx², are input to a digital adder 38 where these values are summed. The output from adder 38 is the Taylor expansion for the first three terms.

The periodic function employed for determining the amplitude in the preferred embodiment is a sine function which is most useful in providing a carrier frequency for the applications of interest. If f(x) and f(a) are chosen to be sin(x) and sin(a) respectively, then f' is cos(a) and f'' is sin(a). Therefore, the series expansion relationship for f(x)=sin(x) is expressed as:

$$\operatorname{Sin}(x) = \sin(a) + k_1(x - a)\cos(a) - \frac{k_2(x - a)^2 \sin(a)}{2}$$

where $K_n$ represents a constant or conversion factor used to adjust the units of each series term. The adjustment in units is required because the phase increments have angular units. While the sine and cosine factors each have no units, the derivatives of these factors do have units associated with the angular (phase) measure which are inserted into each term having a derivative. Therefore, it is necessary to have a conversion factor $K_n$ which includes a multiple of $\frac{1}{2}\pi$ to compensate for the phase units.

At the same time $K_n$ can incorporate additional numbers or values which are useful for making all additions positive. This simplifies the circuitry required to implement the sine converter of the present invention. Also, additional terms can be employed in the series, which alternate between sin(a) and cos(a), where additional accuracy is supported.

Figure 3:
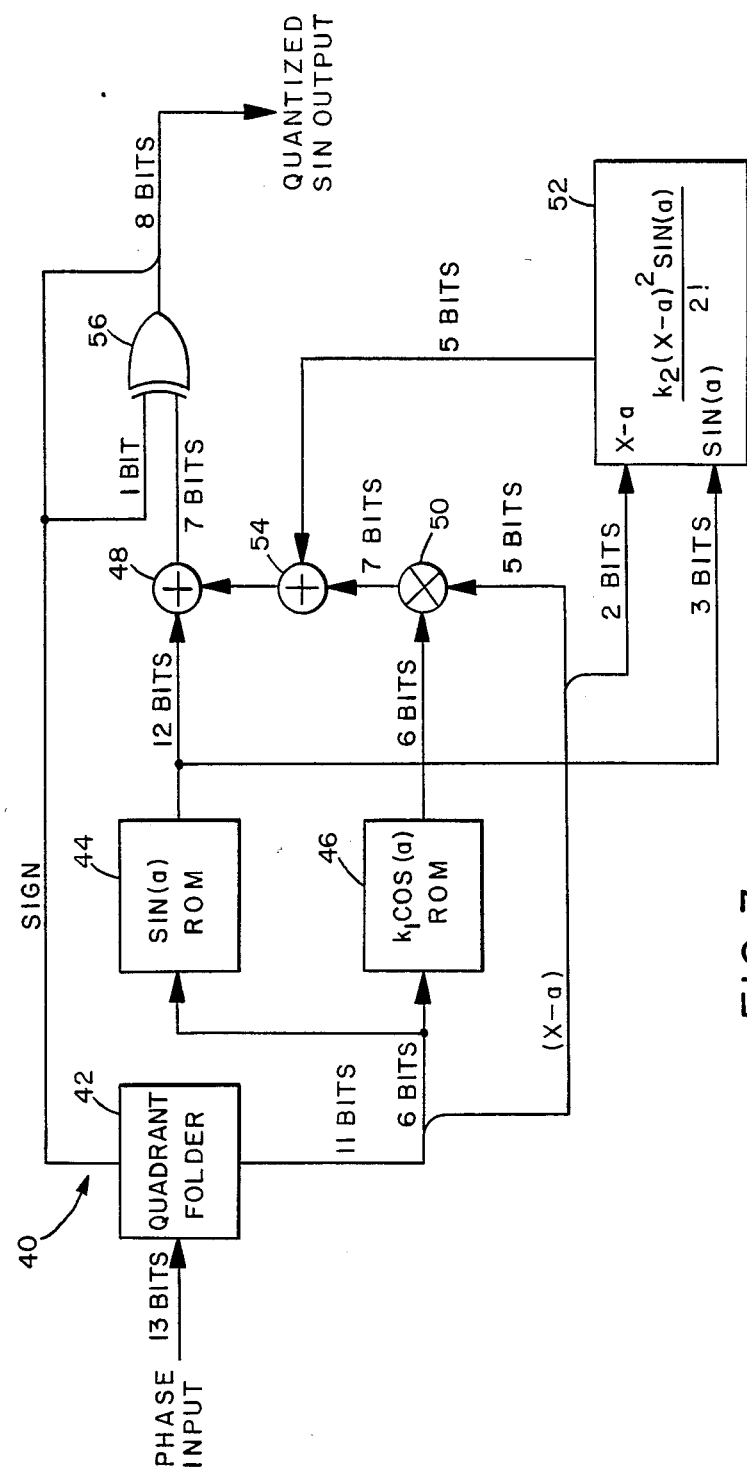
FIG. 3 illustrates a more detailed schematic of one embodiment of the sine conversion circuit of FIG. 2.

FIG. 3 illustrates a more detailed schematic of the apparatus of FIG. 2 usinbg the above sin(x) expansion for implementing a preferred embodiment of the present invention. To provide a high accuracy output, a resolution of 11 bits for input phase data was chosen for this embodiment. An additional 2 bits are used for quadrant mapping or folding, creating a 13 bit wide input for the phase data.

By folding or mapping all input data into the first quadrant ($0 < \phi < \pi/2$) before conversion and then unfolding the resulting amplitude (sign), the ROM size is decreased by a factor of 4. The maximum value for the 11 bit digital phase value is $\pi/2$ which provides 2048 quantization steps ($2^{11}=2048$). The first six or most significant bits establish a coarse approximation of angular phase increment value $d\phi$ of $\pi/2 < \phi < \pi/2^{-5}$ in 64 steps ($\pi$ n/128, for $1 < n < 64$; $2^6 = 64$) and the 5 least significant bits provide a fine approximation or value of $\pi/2^{-6} < \phi < \pi/2^{-11}$.

The 13 bit input is divided by a quadrant folder 42 into an upper sign bit which is sent to a quadrant unfolder at the output and a reverse sign bit. The reverse sign bit is used to reverse the sign on the output phase values. This maps phase data from the 2nd quadrant into the first quadrant, and 4th into 3rd. This mapping is made possible by employing offset binary or is compliment coding in the ROMS for the phase data.

The quadrant folder 42 also splits the remaining 11 bits of input phase data into the upper phase increment "a" and the lower phase increment "x-a".

The six most significant bits of the input phase are selected as the upper phase increment "a" which is transferred simultaneously to a sine ROM 44 and a cosine ROM 46 as address signals. The six most significant bits of the phase input, thus, determine the number of entries in these ROMs. The preferred embodiment employs the 6 most significant bits as the value for "a". However, fewer bits may be selected where coarser steps in phase are desired or more bits where finer steps are desired. The size of ROM available for the accuracy desired and the speed required is determined by, and in turn determines, the size of the value "a" used in the particular application. Larger values of "a" create larger ROM look-up tables and decrease speed and increase costs.

The sine and cosine ROMs use the same address value or word since they are they are computing values for the same angle "a". This saves circuitry and further minimizes the size of integrated circuits used to construct the DDS 10.

The address words or values select specific and corresponding output values from each of the ROMS 44 and 46. The output of the sine ROM 44 is the first term of the series expansion and is transferred to a first adder 48 where it will be summed with the remaining terms of the expansion being invoked.

The six most significant bits are used to divide the input phase data between 0 and $\pi/2$ into the 64 coarse segments or increments. This information is then used to address a table of 64 high resolution or accuracy values in the ROM 44 which are the coarse amplitudes of a sine wave at each of these phase values. For a high resolution output of 12 bits (per amplitude reading) the sine ROM 44 size would, thus, be on the order of 768k bits in storage capacity. Those skilled in the art will readily understand that the six and twelve bit sizes are selected for this preferred embodiment but may be changed where higher speed circuits are available or alternate resolutions desired.

At the same time, the six MSBs are used to address a table of 64 high resolution cosine values in the ROM 46. The ROM 46 output is the first derivative of the sine which is the cosine. The ROM 46 can be constructed to have on the order of 768k bits of storage for 12 bit cosine values. However, the output of the cosine ROM 46 has less significance than the amplitude term. Therefore, this output can be provided with lower accuracy and in the preferred embodiment employs a 6-bit output number.

The output of the cosine ROM 46 is typically configured to incorporate the predetermined unit conversion value k. Since $K_n$ is a predetermined value it is easily incorporated in the cosine numbers stored in the ROM 46. However, where desired, a separate storage element (not shown) can be employed and another multiplier (not shown) used to generate the product of $K_n$ and either the cosine or lower phase increment.

The lower five bits of the input phase data numbers directly translate into the "x-a" term since the upper six bits are "a" and the total digital phase increment value is "x". These five bits comprise a lower phase increment, or fine value, which is used in computing the remaining two terms used in the preferred series expansion.

The five least significant bits, or x-a, are transferred to a first multiplier 50 where they are multiplied times the output of the cosine ROM 46. The 6-bit ROM 46 output is multiplied by the 5-bit "x-a" value. The product generated in the multiplier 50 is provided as a 7 bit output number.

As shown below, the bit alignment for the multiplier 50 output is such that its MSB is aligned with the DAC input least significant bit. This makes the multiplier 50 output number range in size between 1 LSB to 1/64 LSB of the final 7 bit (plus sign bit) DAC input used. It is understood that not all bits available from multiplying the 6-bit cosine and 5-bit phase LSB values are needed to maintain this desired accuracy. Therefore, the multiplier circuitry is configured, as known in the art of electronics, to truncate the multiplication product to a desired 7 bits. However, wider bit widths can be used where desired, such as where additional accuracy is maintained in successive series terms, without departing from the principles of the present invention.

The third expansion term is computed in an expansion ROM 52 by combining the second derivative of sin(a) and the square of the lower phase increment. This is done as shown in FIG. 3 by selecting the upper 2 bits of the "x-a" value as a portion of an address for the ROM 52 and the lower 3 bits of the sine amplitude value from the ROM 44 output as a remaining portion of the data address for the ROM 52. This is possible since the last expansion term only contributes roughly $\frac{1}{8}$ LSB to the DAC input, as shown below, and only the lower bits of the sine amplitude are needed for this degree of accuracy. This type of memory or storage element addressing allows the computation to be selected as a look-up table in ROM but direct computation can be accomplished using computational circuitry known in the art, although this decreases the speed and efficiency of the sine converter 40. In the alternative, the lower 3 bits of the "a" value can be used to address the ROM 52 instead of the output of the ROM 44. Since these bits are used to select the output of the ROM 44, they can also be used directly to address the ROM 52.

As done for the cosine ROM 46, the unit conversion factor is generally included in the values stored in the ROM.

It can be seen that the term computation of the ROM 52 means that a small amount of computation is traded for the larger ROM size which would otherwise be required for the sine look-up table. This optimized approach yields a more efficient use of circuit elements. This improves over the use of a larger ROM where fan out and poor noise also act to decrease accuracy.

The expansion or third series term ROM 52 provides a 5 bit output which allows a contribution of about 1/32 LSB to the final sine converter output 40. The ROM 52 output is combined with the multiplier 50 output in a second adder 54 and then subsequently combined with the ROM 44 output (sin(a)) in the first adder 48. The first and second adders represent digital circuitry well known in the art and not described in further detail here. It will be obvious to those skilled in the art that the output of the ROM 44 and the multiplier 50 can be combined first and then with the output of the ROM 52 where desired.

The amplitude output of the adder 48 is transferred through an Exclusive OR gate 56 where it is adjusted using a sign bit from the quadrant folder 42 to obtain the correct amplitude value associated with the appropriate phase data quadrant. This is possible due to the specific number coding used in the sine amplitude data stored in the ROMS.

Figure 4:
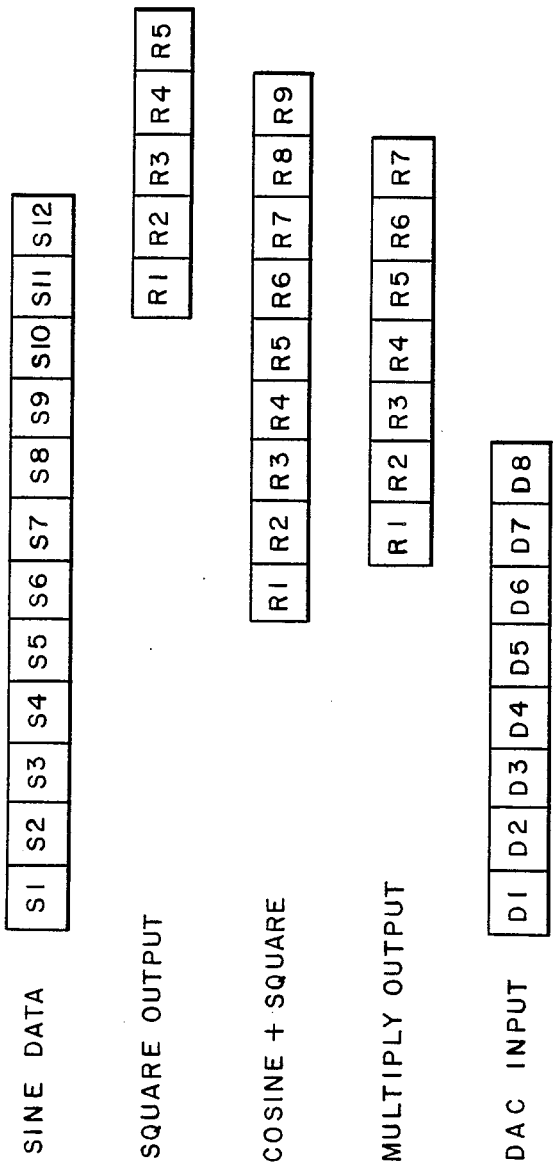
FIG. 4 illustrates relative bit positions of multi-bit data words used in implementing the circuit of FIG. 3.

The sine amplitude data produced by the ROM 44 is 12 bits wide to maximize the resolution of this data for the preferred embodiment. As discussed, the remaining terms comprise lower accuracy terms in the series expansion which contribute successively less to the overall accuracy. Therefore, these terms use a smaller data bit width and are added in relative or appropriate bit positions of the primary sine data. The alignment used for the preferred embodiment is illustrated in FIG. 4.

What has been shown then is a new expansion technique for converting phase data to amplitude data which saves computation time and circuitry while providing high accuracy amplitude values. The above design provides the power dissipation of an 8 bit design but a frequency accuracy on the order of 12 bits.

The foregoing description of a preferred embodiment has been presented for purposes of illustration and description. It is not intended to be exhaustive nor to limit the invention to the precise form disclosed, and many modifications and variations are possible in light of the above teaching. The embodiment was chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim as our invention is:

1. A method of converting phase data into amplitude data of a preselected periodic function, comprising the steps of:
    splitting phase data, corresponding to an independent variable of a preselected periodic function, into an upper phase increment and a lower phase increment;
    generating at least three Taylor series expansion terms relating to said periodic function from said upper and lower phase increments;
    summing said series terms to form an output amplitude.

2. The method of claim 1 wherein said step of generating Taylor series terms from said upper and lower phase increments comprises:
    generating at least three series terms with the Nth term of said series being generated according to the steps of:
    generating an (N−1)th order derivative value corresponding to an (N−1)th order derivative of said periodic function evaluated at said upper phase increment;
    raising said lower phase increment to an (N−1)th power;
    forming an inverse of N−1 factorial; and
    multiplying said (N−1)th order derivative value, raised lower phase increment and inverse of N−1 factorial together to form said Nth term.

3. The method of claim 2 wherein said step of generating three series terms from said upper and lower phase increments comprises generating at least three successive and immediately adjacent terms.

4. The method of claim 3 wherein said steps of generating a plurality of successive terms and summing said terms comprises:
    generating an amplitude value corresponding to said periodic function evaluated at said upper phase increment, as the Nth series term, from upper phase increment;

generating a first derivative value corresponding to a first derivative of said periodic function evaluated at said upper phase increment from said upper phase increment;

generating to a second derivative of said periodic function evaluated at said upper phase increment from said upper phase increment;

multiplying said first derivative value and said lower phase increment together to produce (N+1)th series term; and multiplying said second derivative value, said lower phase increment squared, and inverse of two factorial to generate an (N+2)th series term; and summing said Nth, and (N+1)th, and (N+2)th series terms to form an output amplitude.

5. The method of claim 4 further comprising the steps of:

generating an (N+Y)th order derivative value corresponding to an (N+Y) order derivative of said periodic function evaluated at said upper phase increment from said upper phase increment, where Y is greater than 2;

raising said lower phase increment to an (N+Y)th power to form an (N+Y)th factor;

forming an (N+Y)th series term by multiplying said (N+Y)th factor, said (N+Y)th order derivative value, and an inverse of an (N+Y)th factorial; and adding said (N+Y)th series term to said summer Nth, (N+1)th and (N+2)th series terms.

6. The method of claim 4 wherein said step of summing further comprises the steps of:

summing said (N+1)th and (N+2)th series terms to form a first addend; and summing the first addend and said amplitude to form an output amplitude.

7. The method of claim 4 further comprising the steps of:

providing phase data in the range of 0 to $2\pi$;

detecting a quadrant position for said phase data; and adjusting a sign of said output amplitude to reflect said detected quadrant.

8. The method of claim 4 wherein said steps of generating said amplitude value and said first derivative value comprise directly introducing said upper phase increment split from said phase data into a sine Read Only Memory and a cosine Read Only Memory respectively as data address inputs, said sine Read Only Memory having memory locations in which sine values are stored with each memory location having a unique sine value and data address and said cosine Read Only Memory having memory locations, in which cosine values are stored with each memory location having a unique cosine value and data address, said sine Read Only Memory and cosine Read Only Memory respectively providing said amplitude value and said first derivative value in response to said data adddress inputs.

9. The method of claim 4 wherein the step of generating a (N+2)th series term comprises the steps of:

introducing said lower phase increment split from said phase data value directly into a term Read Only Memory as a portion of a term Read Only Memory data address input; and introducing said amplitude value directly into said term Read Only Memory as a remaining portion of said term Read Only Memory data address, said term Read Only Memory having memory locations in which (N+2)th series term are stored with each memory location having a unique (N+2)th series term and data address, said term Read Only Memory providing said (N+2)th series in response to said term Read Only Memory data address input.

10. The method of claim 2 wherein said step of generating three series terms comprises generating three alternating terms spaced apart by one term.

11. An apparatus for converting phase data into amplitude data of a preselected periodic function, comprising:

input means for splitting phase data corresponding to an independent variable of a preselected periodic function into an upper phase increment and a lower phase increment;

expansion means connected to said input means for generating at least three Taylor series expansion terms about said periodic function from said upper and lower phase increments;

adder means for summing said series terms to form an output amplitude.

12. The apparatus of claim 11 wherein said expansion means comprises:

series generation means for generating at least three successive series terms with the Nth terms of said series being defined as the product of an (N−1)th order derivative of said periodic function evaluated at said upper phase increment, said lower phase increment raised to an (N−1)th power, and an inverse of N−1 factorial.

13. The apparatus of claim 12 wherein said series generation means comprises:

storage means, connected to said input means, for storing for each upper phase increment an amplitude value, a first derivative value and a second derivative value of said periodic function each evaluated at a corresponding upper phase increment, said storage means for receiving an input upper phase increment and responsive thereto for providing a corresponding amplitude value, first derivative value and second derivative value with said amplitude value being a first (N) series terms where N=1, multiplication means connected to said input means and said storage means for respectively receiving said lower phase increment and said first derivative value as evaluated at said upper phase increment to which said lower phase increment corresponds, for multiplying said lower phase increment and said first derivative value so as to produce a second (N+1) series term;

term means connected to said input means and said storage means for respectively receiving said lower phase increment and said second derivative value for generating a third (N+1) series term corresponding to a product of a square of said lower phase increment, said second derivative value and an inverse of 2!.

14. The apparatus of claim 13 wherein said storage means comprises:

amplitude storage means for storing said amplitude values and for providing in response to an input of said upper phase increment a corresponding amplitude value; and derivative storage means for storing said first derivative values and for providing in response to an input of said upper phase increment a corresponding first derivative value of said periodic function, evaluated at said upper phase increment.

15. The apparatus of claim 14 wherein said amplitude storage means comprises a sine Read Only Memory storing predetermined sine values for said upper phase increment and said derivative storage means comprises a cosine Read Only Memory storing predetermined cosine values for said upper increment phase.

16. The apparatus of claim 13 wherein said term means comprises a series term Read Only Memory storing predetermined values for the product of the square of said lower phase increment, the second derivative value and the inverse of 2!.

17. The apparatus of claim 13 further comprising:
second storage means connected to said input means for generating an (N+Y)th order derivative of said periodic function, evaluated at said upper phase increment, in response to an input of said upper phase increment wherein Y>2;
at least a second term means connected to said input means and to said second storage means for receiving said (N+Y)th order derivative of said preselected function, evaluated at said upper phase increment and said lower phase increment, for generating an (N+Y+1)th series term, corresponding to a product of said (N+Y)th order derivative of said lower phase increment raised to the (N+Y)th power and further divided by N+Y factorial and for providing said (N+Y)th series term to said adder means for summing with said other series terms.

18. The apparatus of claim 11 wherein said input means further comprises a quadrant folder for determining which of four quadrants said phase data corresponds and setting a corresponding quadrant value; and said apparatus further comprises quadrant indication means connected to said quadrant folder and said adder means for respectively receiving said quadrant value and said output amplitude and responsive to said quadrant value for adjusting a sign of said output amplitude corresponding to the quadrant to which said phase data corresponds.

19. The apparatus of claim 11 wherein said input means is configured to separate phase data, corresponding to said independent variable of said periodic function, in the form of N-bit phase data words into upper phase increment data words of A bits and lower phase increment data words of N-A bits where A is a predetermined number of most significant bits of said N-bit phase data words.

20. The apparatus of claim 11 further comprising output means for transferring output amplitude data indicative of said periodic function to other apparatus.

* * * * *